United States Patent
Liu et al.

(10) Patent No.: US 11,241,803 B2
(45) Date of Patent: Feb. 8, 2022

(54) ROBOT FOR TESTING LOWER LIMB PERFORMANCE OF SPACESUIT

(71) Applicant: SHENYANG INSTITUTE OF AUTOMATION, CHINESE ACADEMY OF SCIENCES, Liaoning (CN)

(72) Inventors: Jinguo Liu, Liaoning (CN); Haodong Chi, Liaoning (CN); Zheng Li, Liaoning (CN); Tiejun Wang, Liaoning (CN); Keli Chen, Liaoning (CN); Qiang Sun, Liaoning (CN); Lei Xiao, Liaoning (CN); Huaqiang Sun, Liaoning (CN); Xiaoyuan Liu, Liaoning (CN); Cao Tong, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 16/956,582

(22) PCT Filed: Dec. 19, 2018

(86) PCT No.: PCT/CN2018/121935
§ 371 (c)(1),
(2) Date: Jun. 20, 2020

(87) PCT Pub. No.: WO2019/120207
PCT Pub. Date: Jun. 27, 2019

(65) Prior Publication Data
US 2021/0197406 A1 Jul. 1, 2021

(30) Foreign Application Priority Data
Dec. 21, 2017 (CN) .......................... 201711389333.8

(51) Int. Cl.
B25J 11/00 (2006.01)
B25J 17/02 (2006.01)
(Continued)

(52) U.S. Cl.
CPC ........... *B25J 17/0241* (2013.01); *B25J 9/102* (2013.01); *B25J 13/085* (2013.01); *B25J 13/087* (2013.01);
(Continued)

(58) Field of Classification Search
CPC .... B25J 11/00; B25J 17/0241; B25J 19/0054; G01M 13/00; B64G 6/00
See application file for complete search history.

(56) References Cited

U.S. PATENT DOCUMENTS 4,046,262 A * 9/1977 Vykukal .................... B25J 3/04
414/5
7,464,622 B2 * 12/2008 Markert ............... B25J 19/0054
74/490.01
(Continued)

FOREIGN PATENT DOCUMENTS

CN 101024286 A 8/2007
CN 104913925 A 9/2015
(Continued)

*Primary Examiner* — William C Joyce
(74) *Attorney, Agent, or Firm* — Novick, Kim & Lee, PLLC; Allen Xue (57) ABSTRACT

A robot for testing lower limb performance of a spacesuit includes a pressure maintaining box, an air circulation component, an air cooling unit, heat radiating hose components, and two mechanical legs. The air cooling unit is connected with the pressure maintaining box; the air circulation component is arranged in the pressure maintaining box; the mechanical legs are installed on the pressure maintaining box, and the heat radiating hose components are arranged in the mechanical legs; air in the pressure maintaining box is cooled through the air cooling unit and
(Continued)

delivered into the heat radiating hose components through the air circulation component; each mechanical leg comprises a thigh, a knee joint component, a shank, an ankle joint component and a foot; the thigh is connected with the shank through the knee joint component; the shank is connected with the foot through the ankle joint component.

11 Claims, 8 Drawing Sheets

(51) Int. Cl.
*B25J 9/10* (2006.01)
*B25J 13/08* (2006.01)
*B25J 19/00* (2006.01)
*G01M 13/00* (2019.01)
*B64G 6/00* (2006.01)

(52) U.S. Cl.
CPC ......... *B25J 19/0054* (2013.01); *G01M 13/00* (2013.01); *B64G 6/00* (2013.01)

(56) References Cited

U.S. PATENT DOCUMENTS

| | | | |
|---|---|---|---|
| 2005/0126327 A1* | 6/2005 | Markert | ............... B25J 19/0054 |
| | | | 74/490.02 |
| 2006/0128261 A1* | 6/2006 | Kawabe | ............... B25J 19/0054 |
| | | | 446/268 |
| 2006/0229160 A1 | 10/2006 | Talluri | |

FOREIGN PATENT DOCUMENTS

| | | |
|---|---|---|
| CN | 107884177 A | 4/2018 |
| CN | 207585905 U | 7/2018 |

* cited by examiner

ROBOT FOR TESTING LOWER LIMB PERFORMANCE OF SPACESUIT

TECHNICAL FIELD

The present invention relates to the technical field of spacesuit performance tests, and in particular to a robot for testing lower limb performance of a spacesuit.

BACKGROUND

The spacesuit is an important life support system for astronauts to perform star catalogue operation and space operation. Unlike the ground operation, the star catalogue operation and the space operation require that all joint systems of the spacesuit have good mobility and flexibility so as to complete star catalogue walk, detection, maintenance, transportation and other missions. Therefore, performance tests of spacesuit life and motion resistance torque directly affect the safety of on-orbit operation of astronauts and the success or failure of the entire space mission.

Most of the existing testing devices of lower limb performance of the spacesuit are of external structures, adopt a pneumatic manner as a driving source, are quite different from the form that the astronauts wear the spacesuit to perform the star catalogue operation or the space operation, and cannot well simulate the flexion-extension process of the knee joint and the ankle joint when the astronauts wear the spacesuit to walk. The external testing devices occupy large space.

SUMMARY

The purpose of the present invention is to provide a robot for testing lower limb performance of a spacesuit. The control precision of motion tracks of mechanical legs is high and the internal temperature is ensured to be constant. In addition, all sections of the mechanical legs adopt telescopic structures sleeved with multi-section shells; the size is adjustable; and the robot can be suitable for testing lower limb performance of spacesuits with different sizes.

The purpose of the present invention is realized by the following technical solution:

A robot for testing lower limb performance of a spacesuit comprises a pressure maintaining box, an air circulation component, an air cooling unit, heat radiating hose components and two mechanical legs; the air cooling unit is connected with the pressure maintaining box through a pipeline; the air circulation component is arranged in the pressure maintaining box; the two mechanical legs are installed on the pressure maintaining box, and the heat radiating hose components are arranged in the mechanical legs; air in the pressure maintaining box is cooled through the air cooling unit and delivered into the heat radiating hose components through the air circulation component; each mechanical leg comprises a thigh, a knee joint component, a shank, an ankle joint component and a foot; the thigh is connected with the shank through the knee joint component; the shank is connected with the foot through the ankle joint component; the knee joint component is provided with a knee joint driving component and a knee joint transmission component; and the ankle joint component is provided with an ankle joint driving component and an ankle joint transmission component.

Each mechanical leg is connected with the pressure maintaining box through a connecting component; the connecting component comprises a first connecting seat, a second connecting seat, a worm, a worm gear and a connecting pin shaft; the first connecting seat and the second connecting seat are hinged by the connecting pin shaft; the worm is arranged in the first connecting seat; the worm gear is arranged in the second connecting seat; the worm gear is sleeved on the connecting pin shaft; the worm is engaged with the worm gear; the first connecting seat is connected with the pressure maintaining box; and the second connecting seat is fixedly connected with the thigh of the mechanical leg.

The thigh comprises a plurality of housings which are sleeved together in sequence; the upper end of a first thigh shell is connected with the pressure maintaining box through a connecting component; the lower end of the first thigh shell is connected with a second thigh shell; a thigh shell sliding guide is arranged between the first thigh shell and the second thigh shell; the shank comprises a plurality of housings which are sleeved together in sequence; the upper end of a first shank shell is hinged with the knee joint component; the lower end of the first shank shell is connected with a second shank shell; and a shank shell sliding guide is arranged between the first shank shell and the second shank shell.

The knee joint component comprises a knee joint shell, a knee joint driving component, a knee joint transmission component and a knee joint hinging shaft; the upper end of the knee joint shell is fixedly connected with the lower end of the thigh; the lower end of the knee joint shell is hinged with the upper end of the shank through the knee joint hinging shaft; the knee joint transmission component comprises a first knee joint transmission group and a second knee joint transmission group; the knee joint driving component and the first knee joint transmission group are arranged in the thigh; and the second knee joint transmission group is arranged in the knee joint shell.

The first knee joint transmission group comprises a knee joint driving gear, a knee joint driven gear and a knee joint transmission decelerator, wherein the knee joint driving gear is fixedly connected with an output shaft of the knee joint driving component; and the knee joint driven gear is installed on an input shaft of the knee joint transmission decelerator and engaged with the knee joint driving gear.

The second knee joint transmission group comprises a knee joint driving bevel gear and a knee joint driven bevel gear; the knee joint driving bevel gear is fixedly installed on an output shaft of the knee joint transmission decelerator; and the knee joint driven bevel gear is fixedly installed on the knee joint hinging shaft and engaged with the knee joint driving bevel gear.

The knee joint hinging shaft is provided with a knee joint torque sensor; in addition, a knee joint photoelectric switch is arranged in the upper end of the shank; and the knee joint shell is provided with a knee joint sensing pin shaft matched with the knee joint photoelectric switch.

The ankle joint component comprises an ankle joint shell, an ankle joint driving component, an ankle joint transmission component and an ankle joint hinging shaft; the upper end of the ankle joint shell is fixedly connected with the lower end of the shank; the lower end of the ankle joint shell is hinged with the foot through the ankle joint hinging shaft; the ankle joint transmission component comprises a first ankle joint transmission group and a second ankle joint transmission group; the ankle joint driving component and the first ankle joint transmission group are arranged in the shank; and the second ankle joint transmission group is arranged in the ankle joint shell.

The first ankle joint transmission group comprises an ankle joint driving gear, an ankle joint driven gear and an ankle joint transmission decelerator; the ankle joint driving gear is fixedly installed on an output shaft of the ankle joint driving component; and the ankle joint driven gear is installed on an input shaft of the ankle joint transmission decelerator and engaged with the ankle joint driving gear.

The second ankle joint transmission group comprises an ankle joint driving bevel gear and an ankle joint driven bevel gear; the ankle joint driving bevel gear is fixedly installed on an output shaft of the ankle joint transmission decelerator; and the ankle joint driven bevel gear is fixedly installed on the ankle joint hinging shaft and engaged with the ankle joint driving bevel gear.

The ankle joint hinging shaft is provided with an ankle joint torque sensor; in addition, an ankle joint photoelectric switch is arranged in the foot; and the ankle joint shell is provided with an ankle joint sensing pin shaft matched with the ankle joint photoelectric switch.

The foot comprises a connecting seat, a sliding pipe, a foot shell and a foot bottom plate; the upper end of the connecting seat is hinged with the ankle joint component, and the lower end is connected with the foot shell through the sliding pipe; and the lower side of the foot shell is fixedly connected with the foot bottom plate.

The heat radiating hose component comprises a thigh air pipe component arranged in the thigh and a shank air pipe component arranged in the shank; the thigh air pipe component comprises a thigh air suction pipe and a thigh air blowing pipe; and the shank air pipe component comprises a shank air suction pipe, a shank air blowing pipe and a shank backup air pipe.

The air circulation component comprises an axial flow fan and a vacuum pump; the thigh air blowing pipe and the shank air blowing pipe blow air through the axial flow fan; the thigh air suction pipe and the shank air suction pipe suck air through the vacuum pump; temperature sensors are arranged in the thigh and the shank; and the shank backup air pipe is started when the temperature sensors give alarms.

The present invention has the advantages and positive effects that:

1. The knee joint component and the ankle joint component in the present invention are respectively used for driving the shank and the foot to swing; the control precision of motion tracks of the mechanical legs is high; in addition, the mechanical legs are connected with the pressure maintaining box through the connecting component with the worm gear and the worm; and the connecting component can adjust and maintain the angles of the mechanical legs through the worm gear and the worm.

2. All sections of the mechanical legs in the present invention adopt telescopic structures sleeved with multi-section shells, and can be locked in any position within the travel range; and spacesuits with different sizes can be tested as required so that the mechanical legs have better adaptability.

3. The present invention uses the air cooling unit to cool the air in the pressure maintaining box, and uses the heat radiating hose to form driving air backflow in the mechanical leg shell, so as to prevent the heat generated by a driving motor and the like in work from scorching a comfortable lining on an inner layer of the spacesuit; and the present invention has better heat radiating effect.

Wherein 1 thigh; 101 first thigh shell; 102 second thigh shell; 103 third thigh shell; 104 thigh shell sliding guide; 2 connecting component; 201 first connecting flange; 202 first connecting screw; 203 second connecting screw; 204 second connecting flange; 205 worm hoop; 206 hoop fixing screw; 207 worm gear; 208 second connecting seat; 209 pin shaft stop block; 210 stop block fixing screw; 211 connecting pin shaft; 212 worm; 213 first connecting seat; 3 knee joint component; 301 knee joint shell; 3011 bearing pressing cover; 302 knee joint driving component; 3021 knee joint encoder; 3022 knee joint motor; 3023 knee joint decelerator; 3024 knee joint installing flange; 303 knee joint transmission component; 3031 knee joint driving gear; 3032 knee joint driven gear; 3033 knee joint transmission decelerator; 3034 knee joint driving bevel gear; 3035 knee joint driven bevel gear; 304 knee joint hinging shaft; 3041 knee joint torque sensor; 305 knee joint photoelectric switch; 3051 knee joint sensing pin shaft; 3052 switch installing frame; 4 shank; 401 first shank shell; 4011 connecting support plate; 402 second shank shell; 403 shank shell sliding guide; 5 ankle joint component; 501 ankle joint shell; 502 ankle joint driving component; 5021 ankle joint encoder; 5022 ankle joint motor; 5023 ankle joint decelerator; 5024 ankle joint installing flange; 503 ankle joint transmission component; 5031 ankle joint driving gear; 5032 ankle joint driven gear; 5033 ankle joint transmission decelerator; 5034 ankle joint driving bevel gear; 5035 ankle joint driven bevel gear; 504 ankle joint hinging shaft; 5041 ankle joint torque sensor; 505 ankle joint photoelectric switch; 5051 ankle joint sensing pin shaft; 6 foot; 601 sliding pipe; 602 connecting seat; 603 foot shell; 604 foot bottom plate; 7 pressure maintaining box; 701 axial flow fan; 702 vacuum pump; 703 vacuum pump base; 704 fan base; 705 evaporator; 706 installing plate; 8 trolley; 9 heat radiating hose component; 901 thigh air suction pipe; 902 thigh air blowing pipe; 903 shank air blowing pipe; 904 shank air suction pipe; 905 shank backup air pipe; 10 electric control cabinet; 11 air cooling unit; and 12 cooling interface.

DETAILED DESCRIPTION

The present invention is further detailed below in combination with the drawings.

Figure 1:
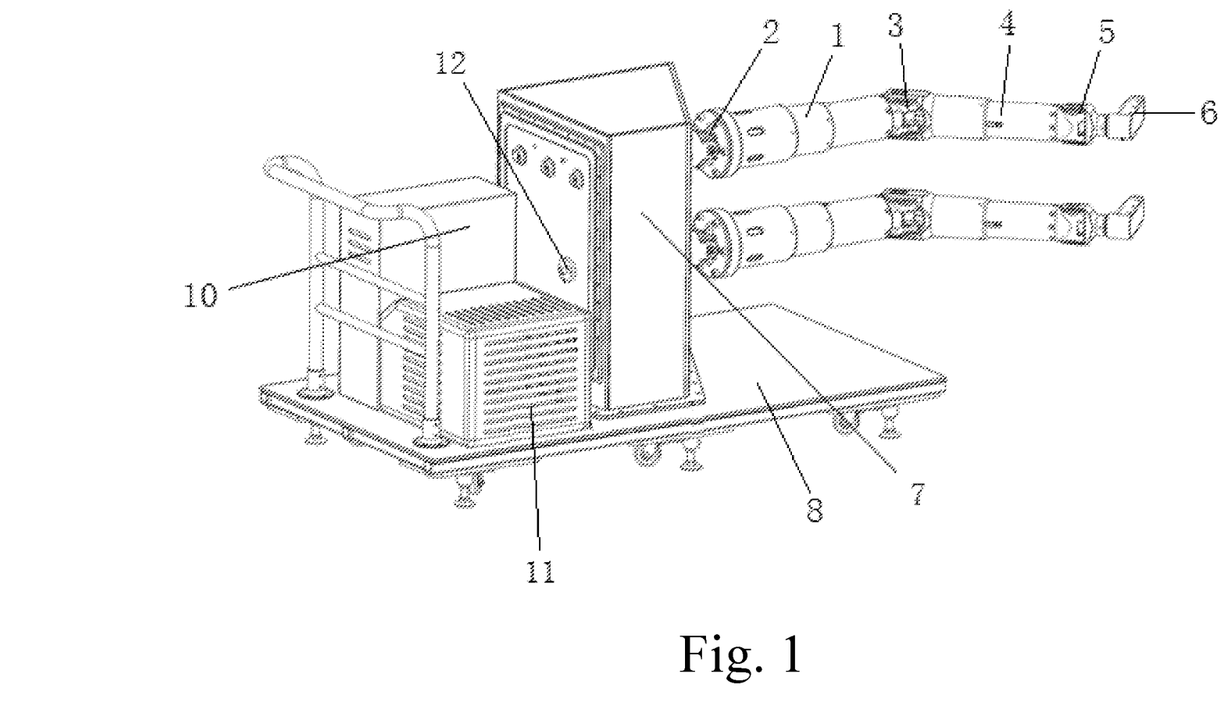
FIG. 1 is a schematic diagram of the present invention.

As shown in FIGS. 1-12, the present invention comprises a pressure maintaining box 7, an air circulation component, an air cooling unit 11, an electric control cabinet 10, heat radiating hose components 9 and two mechanical legs, wherein as shown in FIG. 1, the pressure maintaining box 7, the air cooling unit 11 and the electric control cabinet 10 are arranged on a trolley 8, and the air cooling unit 11 is connected with a cooling interface 12 on the pressure maintaining box 7 through a pipeline; the air cooling unit 11 is used for cooling the air in the pressure maintaining box 7; the air circulation component is arranged in the pressure maintaining box 7; the two mechanical legs are installed on the pressure maintaining box 7, and the heat radiating hose components 9 are arranged in the mechanical legs; the cooling air in the pressure maintaining box 7 enters the heat radiating hose components 9 under the action of the air circulation component, and enters the mechanical legs through the heat radiating hose components for cooling. The air cooling unit 11 is a known technology in the art.

Figure 2:
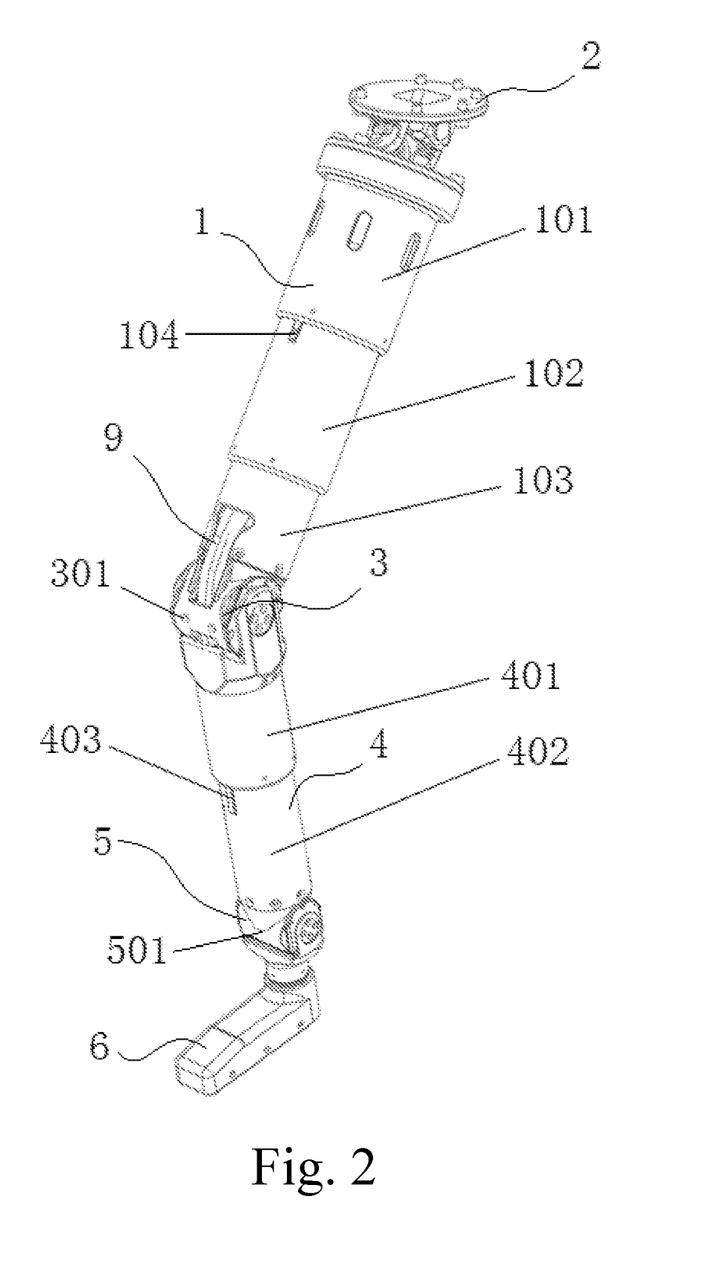
FIG. 2 is a schematic diagram of a mechanical leg in FIG. 1.
Figure 3:
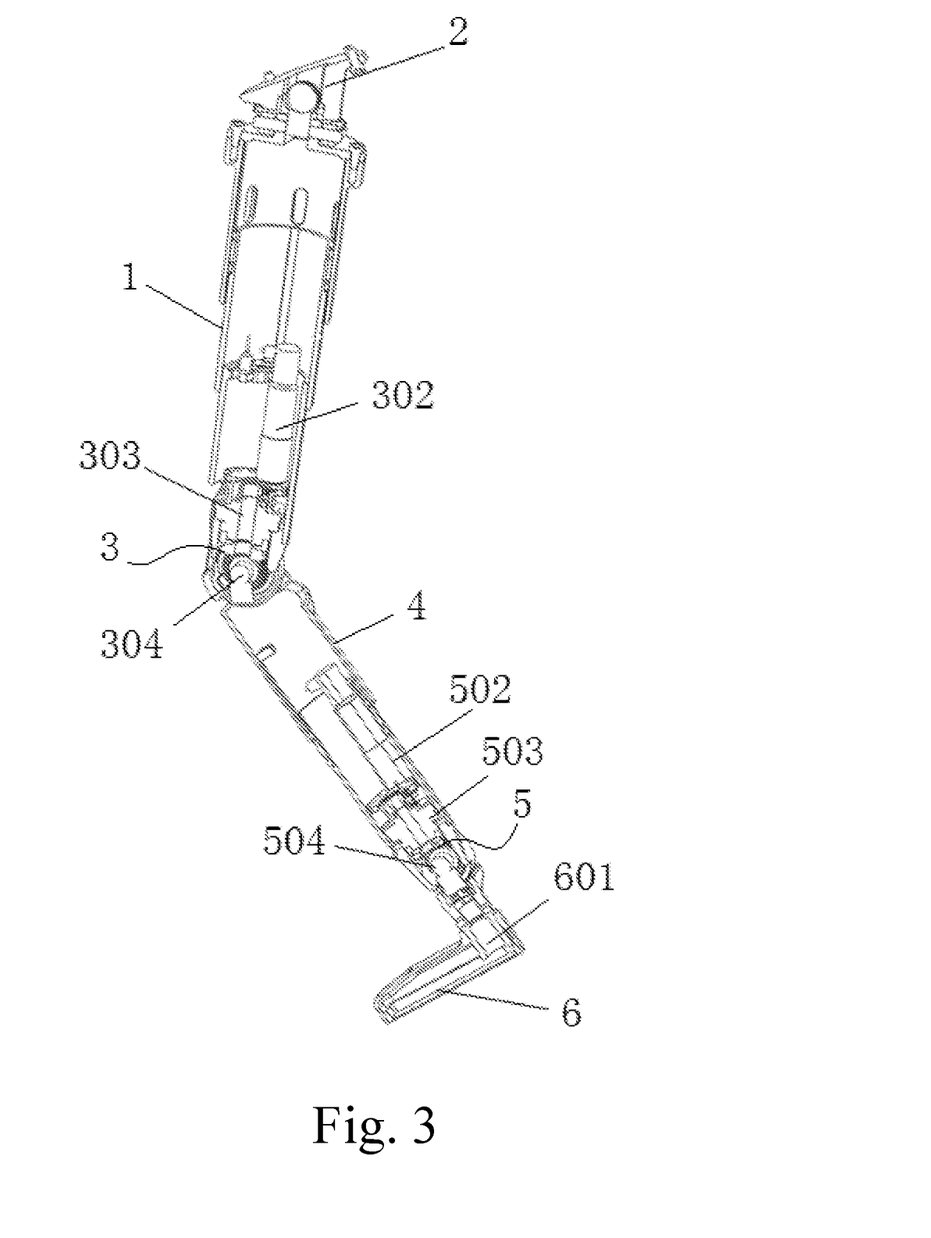
FIG. 3 is a sectional view of a mechanical leg in FIG. 2.

As shown in FIGS. 1-3, each mechanical leg comprises a thigh 1, a knee joint component 3, a shank 4, an ankle joint component 5 and a foot 6; the thigh 1 is connected with the shank 4 through the knee joint component 3; the shank 4 is connected with the foot 6 through the ankle joint component 5; the knee joint component 3 is provided with a knee joint driving component 302 and a knee joint transmission component 303; the shank 4 is driven to swing by the knee joint driving component 302, and the knee joint driving component 302 transmits a torque through the knee joint transmission component 303; the ankle joint component 5 is provided with an ankle joint driving component 502 and an ankle joint transmission component 503; and the foot 6 is driven to swing by the ankle joint driving component 502, and the ankle joint driving component 502 transmits the torque through the ankle joint transmission component 503.

Figure 4:
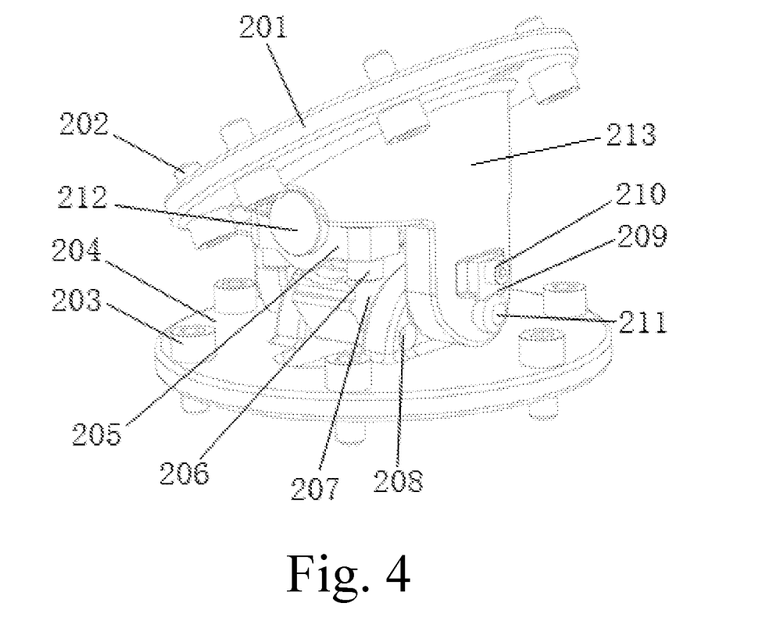
FIG. 4 is a schematic diagram of a connecting component in FIG. 2.
Figure 5:
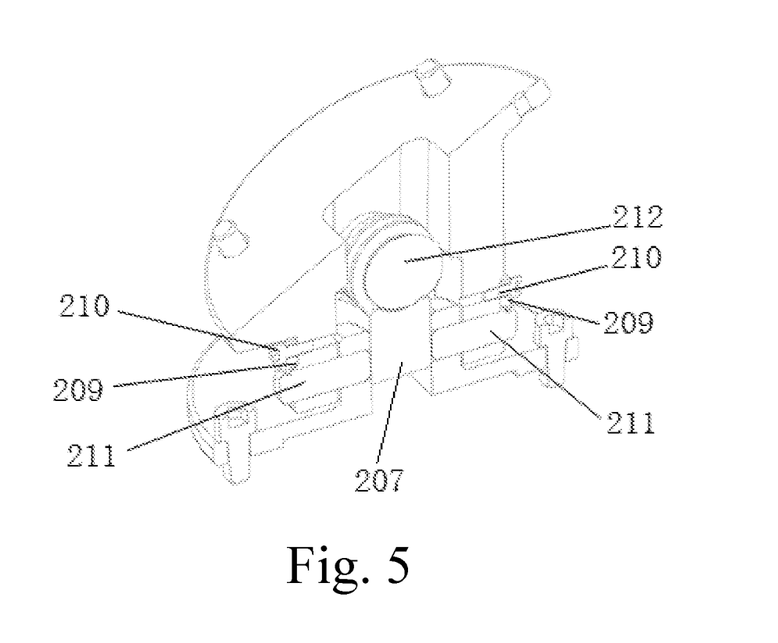
FIG. 5 is a sectional view of a connecting component in FIG. 4.

As shown in FIG. 1, each mechanical leg is connected with the pressure maintaining box 7 through a connecting component 2. As shown in FIGS. 4-5, the connecting component 2 comprises a first connecting seat 213, a second connecting seat 208, a worm 212, a worm gear 207 and a connecting pin shaft 211; the first connecting seat 213 and the second connecting seat 208 are hinged by the connecting pin shaft 211; the worm 212 is arranged in the first connecting seat 213; the worm gear 207 is arranged in the second connecting seat 208; the worm gear 207 is sleeved on the connecting pin shaft 211; the worm 212 is engaged with the worm gear 207; the first connecting seat 213 is provided with a first connecting flange 201, and the first connecting flange 201 is connected with the pressure maintaining box 7 through a first connecting screw 202; and the second connecting seat 208 is provided with a second connecting flange 204, and the second connecting flange 204 is fixedly connected with the thigh 1 of the mechanical leg through a second connecting screw 203.

As shown in FIGS. 4-5, the worm 212 is limited and installed on the first connecting seat 213 through a worm hoop 205, and the worm hoop 205 is fixed to the first connecting seat 213 through a hoop fixing screw 206; and both ends of the connecting pin shaft 211 are limited and installed on the second connecting seat 208 through a pin shaft stop block 209, and the pin shaft stop block 209 is fixed to the second connecting seat 208 through a stop block fixing screw 210.

As shown in FIGS. 2-3, the thigh 1 comprises a plurality of housings which are sleeved together in sequence. In the present embodiment, the thigh 1 comprises three layers of housings, wherein the upper end of a first thigh shell 101 is fixedly connected with connecting component 2; the upper end of a second thigh shell 102 is inserted into the lower end of the first thigh shell 101; the upper end of a third thigh shell 103 is inserted into the lower end of the second thigh shell 102; and the lower end of the third thigh shell 103 is fixedly connected with the knee joint component 3.

As shown in FIG. 2, a thigh shell sliding guide 104 is arranged between the first thigh shell 101 and the second thigh shell 102; the upper end of the thigh shell sliding guide 104 is fixedly connected with the inner side of the lower end of the first thigh shell 101; the upper end of the second thigh shell 102 is provided with a chute matched with the thigh shell sliding guide 104; and after the positions of the first thigh shell 101 and the second thigh shell 102 are determined, the thigh shell sliding guide 104 is fixed to the second thigh shell 102 through a screw.

Figure 6:
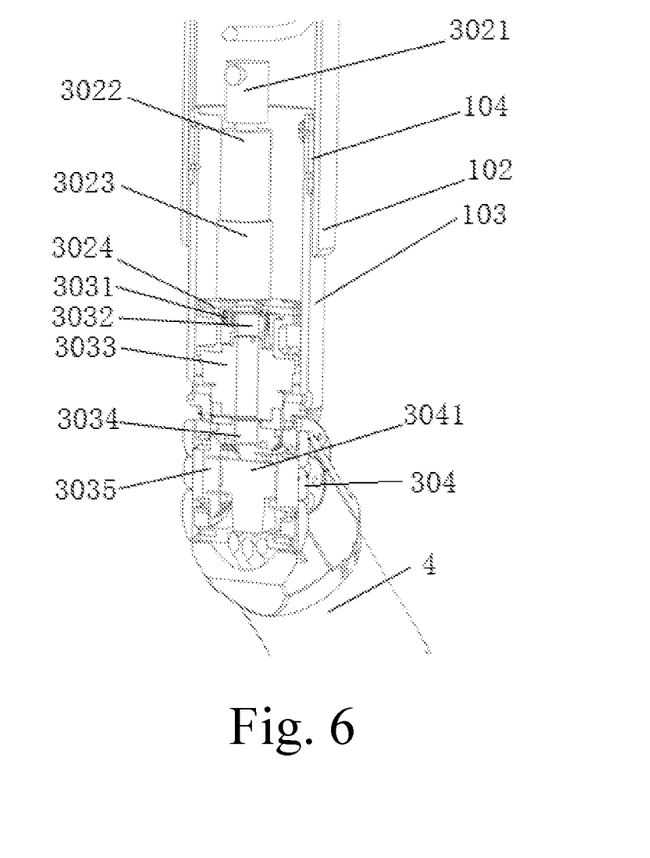
FIG. 6 is a schematic diagram of a knee joint component in FIG. 2.

As shown in FIGS. 2-3 and 6, the knee joint component 3 comprises a knee joint shell 301, a knee joint driving component 302, a knee joint transmission component 303 and a knee joint hinging shaft 304, wherein the upper end of the knee joint shell 301 is fixedly connected with the lower end of the third thigh shell 103 of the thigh 1; the lower end is hinged with the shank 4 through the knee joint hinging shaft 304; the knee joint transmission component 303 comprises a first knee joint transmission group and a second knee joint transmission group; the knee joint driving component 302 and the first knee joint transmission group are arranged in the thigh 1; and the second knee joint transmission group is arranged in the knee joint shell 301.

As shown in FIG. 6, the knee joint driving component 302 comprises a knee joint motor 3022 and a knee joint decelerator 3023; the output end of the knee joint motor 3022 is connected with the knee joint encoder 3021; the tail end of the knee joint motor 3022 is provided with the knee joint encoder 3021; a knee joint installing flange 3024 is arranged in the third thigh shell 103 of the thigh 1; and the knee joint decelerator 3023 is fixedly installed on the knee joint installing flange 3024, and the output shaft is connected with the first knee joint transmission group. In the present embodiment, the knee joint decelerator 3023 is a planetary gear reducer.

As shown in FIG. 6, the first knee joint transmission group comprises a knee joint driving gear 3031, a knee joint driven gear 3032 and a knee joint transmission decelerator 3033, wherein the knee joint driving gear 3031 is fixedly connected with an output shaft of the knee joint decelerator 3023; the knee joint driven gear 3032 is installed on an input shaft of the knee joint transmission decelerator 3033 and engaged with the knee joint driving gear 3031; and the output shaft of the knee joint transmission decelerator 3033 is connected with the second knee joint transmission group. In the present embodiment, the knee joint transmission decelerator 3033 is a harmonic reducer.

As shown in FIG. 6, the second knee joint transmission group comprises a knee joint driving bevel gear 3034 and a knee joint driven bevel gear 3035; the knee joint driving bevel gear 3034 is fixedly installed on an output shaft of the knee joint transmission decelerator 3033; and the knee joint driven bevel gear 3035 is fixedly installed on the knee joint hinging shaft 304 and engaged with the knee joint driving bevel gear 3034.

Figure 7:
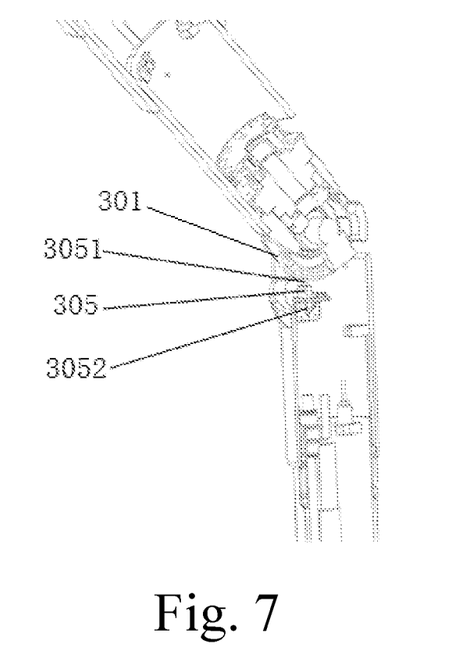
FIG. 7 is a schematic diagram of a knee joint component from another angle in FIG. 6.
Figure 8:
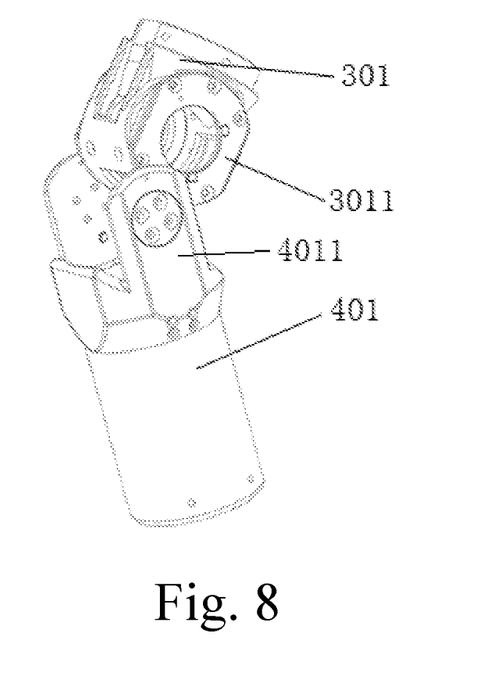
FIG. 8 is a schematic diagram of connection of a knee joint shell and a shank in FIG. 6.

As shown in FIG. 6, the knee joint hinging shaft 304 is supported and installed on the knee joint shell 301 through a bearing. As shown in FIG. 8, the knee joint shell 301 is provided with a bearing pressing cover 3011 for fixing the bearing. In addition, the upper end of the shank 4 is provided with a connecting support plate 4011; and the end part of the knee joint hinging shaft 304 extends from the knee joint shell 301 and then is inserted into the connecting support plate 4011, thereby realizing the hinging of the knee joint shell 301 and the shank 4. As shown in FIG. 6, the knee joint hinging shaft 304 is provided with a knee joint torque sensor 3041 for detecting the knee joint torque of the mechanical leg in real time; in addition, as shown in FIG. 7, a knee joint photoelectric switch 305 is arranged in the upper end of the shank 4; the knee joint shell 301 is provided with a knee joint sensing pin shaft 3051 matched with the knee joint photoelectric switch 305; a switch installing frame 3052 is arranged in the upper end of the shank 4; and the knee joint photoelectric switch 305 is installed on the switch installing frame 3052. The knee joint encoder 3021, the knee joint torque sensor 3041 and the knee joint photoelectric switch 305 are the known technologies in the art.

As shown in FIGS. 2-3, the shank 4 comprises a plurality of housings which are sleeved together in sequence. In the present embodiment, the shank 4 comprises two layers of housings, wherein the upper end of a first shank shell 401 is hinged with the knee joint shell 301 in the knee joint component 3; the upper end of the second shank shell 402 is inserted into the lower end of the first shank shell 401; the lower end of the second shank shell 402 is fixedly connected with the ankle joint component 5; a shank shell sliding guide 403 is arranged between the first shank shell 401 and the second shank shell 402; the upper end of the shank shell sliding guide 403 is fixedly connected with the inner side of the lower end of the first shank shell 401; the upper end of the second shank shell 402 is provided with a chute matched with the shank shell sliding guide 403; and after the positions of the first shank shell 401 and the second shank shell 402 are determined, the shank shell sliding guide 403 is fixed to the second shank shell 402 through a screw.

Figure 9:
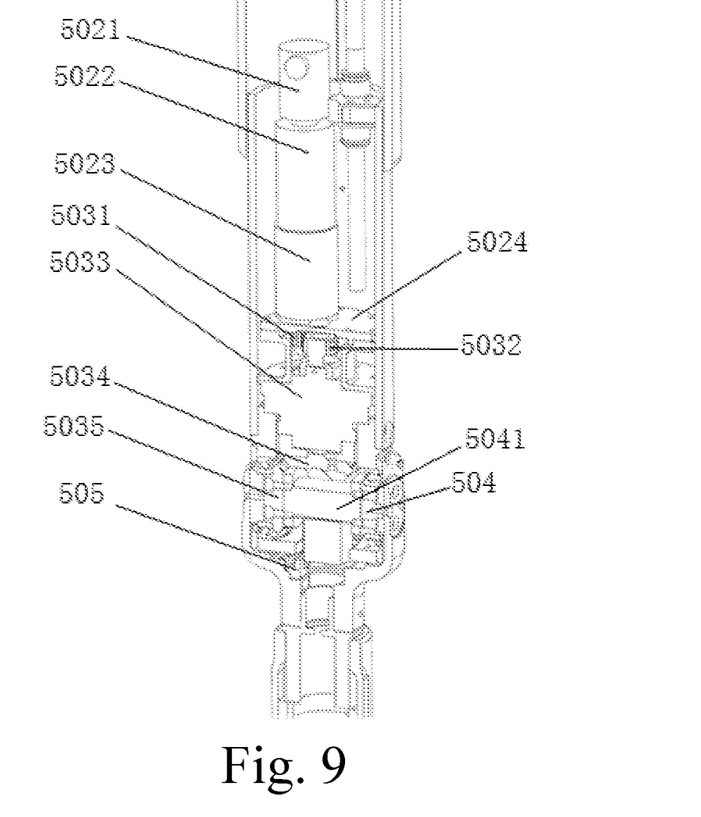
FIG. 9 is a schematic diagram of an ankle joint component in FIG. 2.

As shown in FIGS. 2-3 and 9, the ankle joint component 5 comprises an ankle joint shell 501, an ankle joint driving component 502, an ankle joint transmission component 503 and an ankle joint hinging shaft 504; the upper end of the ankle joint shell 501 is fixedly connected with the lower end of the second shank shell 402 of the shank 4; the lower end is hinged with the foot 6 through the ankle joint hinging shaft 504; the ankle joint transmission component 503 comprises a first ankle joint transmission group and a second ankle joint transmission group; the ankle joint driving component 502 and the first ankle joint transmission group are arranged in the shank 4; and the second ankle joint transmission group is arranged in the ankle joint shell 501.

As shown in FIG. 9, the ankle joint driving component 502 comprises an ankle joint motor 5022 and an ankle joint decelerator 5023; the output end of the ankle joint motor 5022 is fixedly connected with the ankle joint decelerator 5023; the tail end of the ankle joint motor 5022 is provided with the ankle joint encoder 5021; the lower end of the second shank shell 402 of the shank 4 is provided with an ankle joint installing flange 5024; and the ankle joint decelerator 5023 is fixedly installed on the ankle joint installing flange 5024, and the output shaft is connected with the first ankle joint transmission group. In the present embodiment, the ankle joint decelerator 5023 is a planetary gear reducer.

As shown in FIG. 9, the first ankle joint transmission group comprises an ankle joint driving gear 5031, an ankle joint driven gear 5032 and an ankle joint transmission decelerator 5033; the ankle joint driving gear 5031 is fixedly installed on an output shaft of the ankle joint decelerator 5023; the ankle joint driven gear 5032 is installed on an input shaft of the ankle joint transmission decelerator 5033 and engaged with the ankle joint driving gear 5031; and the output shaft of the ankle joint transmission decelerator 5033 is connected with the second ankle joint transmission group. In the present embodiment, the ankle joint transmission decelerator 5033 is a harmonic reducer.

As shown in FIG. 9, the second ankle joint transmission group comprises an ankle joint driving bevel gear 5034 and an ankle joint driven bevel gear 5035; the ankle joint driving bevel gear 5034 is fixedly installed on an output shaft of the ankle joint transmission decelerator 5033; and the ankle joint driven bevel gear 5035 is fixedly installed on the ankle joint hinging shaft 504 and engaged with the ankle joint driving bevel gear 5034.

Figure 10:
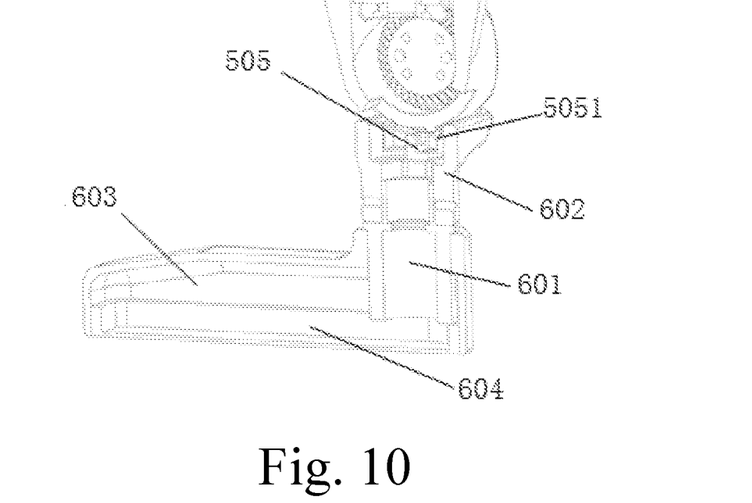
FIG. 10 is a sectional view of a foot in FIG. 2.

As shown in FIG. 9, the ankle joint hinging shaft 504 is supported and installed on the ankle joint shell 501 through a bearing. As shown in FIG. 10, the foot 6 is provided with a connecting seat 602; and the ankle joint shell 501 is hinged with the connecting seat 602 through the ankle joint hinging shaft 504. As shown in FIG. 9, the ankle joint hinging shaft 504 is provided with an ankle joint torque sensor 5041 for detecting the ankle joint torque of the mechanical leg in real time. In addition, as shown in FIG. 10, an ankle joint photoelectric switch 505 is arranged in the connecting seat 602 of the foot 6; and the ankle joint shell 501 is provided with an ankle joint sensing pin shaft 5051 matched with the ankle joint photoelectric switch 505. The ankle joint encoder 5021, the ankle joint torque sensor 5041 and the ankle joint photoelectric switch 505 are the known technologies in the art.

As shown in FIG. 10, the foot 6 comprises a connecting seat 602, a sliding pipe 601, a foot shell 603 and a foot bottom plate 604; the upper end of the connecting seat 602 is hinged with the ankle joint shell 501, and the lower end is connected with the foot shell 603 through the sliding pipe 601; the sliding pipe 601 and the foot shell 603 are in threaded connection; the sliding pipe 601 is screwed to adjust the distance between the ankle joint of the mechanical leg and the foot 6; and the lower side of the foot shell 603 is fixedly connected with the foot bottom plate 604 through a screw.

Figure 11:
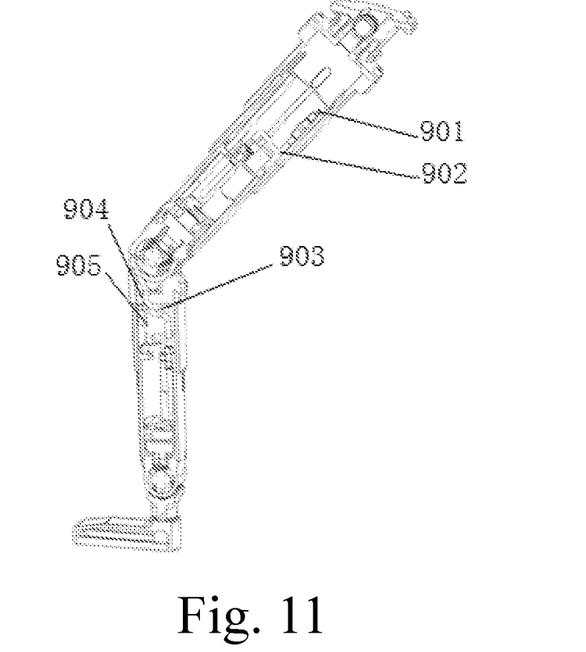
FIG. 11 is a schematic diagram of distribution of a heat radiating hose component in FIG. 2.

As shown in FIGS. 2 and 11, the heat radiating hose component 9 comprises a thigh air pipe component and a shank air pipe component, wherein the thigh air pipe component comprises a thigh air suction pipe 901 and a thigh air blowing pipe 902; the thigh air suction pipe 901 and the thigh air blowing pipe 902 are fixedly arranged in the thigh 1; the end of the thigh air suction pipe 901 extends near the encoder at the tail end of the knee joint driving component 302; the end of the thigh air blowing pipe 902 extends near the knee joint decelerator 3023 below the knee joint driving component 302; the shank air pipe component comprises a shank air suction pipe 904, a shank air blowing pipe 903 and a shank backup air pipe 905; the shank air suction pipe 904, the shank air blowing pipe 903 and the shank backup air pipe 905 are fixedly arranged in the shank 4, and the end of the shank air suction pipe 904 extends near the encoder at the tail end of the ankle joint driving component 502; the shank backup air pipe 905 and the shank air suction pipe 904 are arranged side by side; and the end of the shank air blowing pipe 903 extends near the ankle joint decelerator 5023 below the ankle joint driving component 502.

Figure 12:
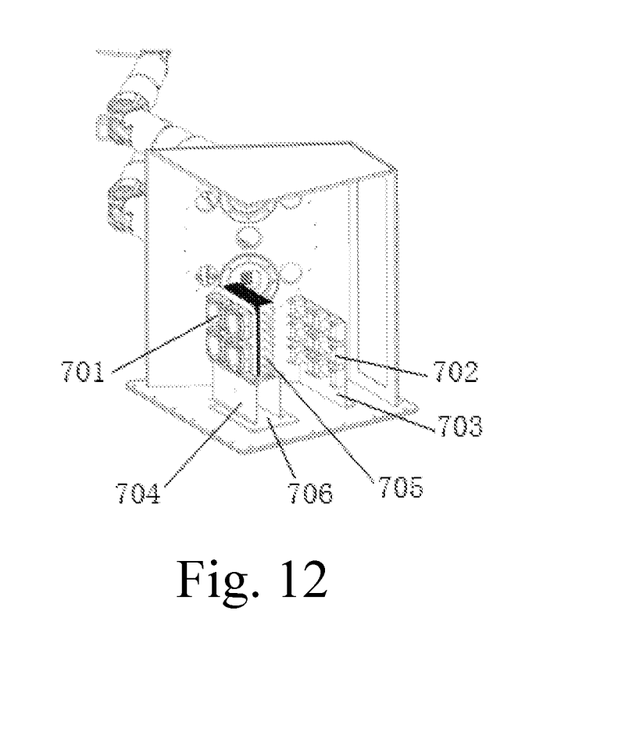
FIG. 12 is an internal schematic diagram of a pressure maintaining box in FIG. 1.

The air circulation component is arranged in the pressure maintaining box 7; and the heat radiating hose components 9 are connected with the air circulation component. As shown in FIG. 12, the air circulation component comprises an axial flow fan 701 and a vacuum pump 702; the axial flow fan 701 is used for blowing air into the thigh air blowing pipe 902 and the shank air blowing pipe 903; and the vacuum pump 702 is used for sucking air from the thigh air suction pipe 901 and the shank air suction pipe 904, thereby respectively forming air backflow in the thigh 1 and the shank 4. A fan base 704 and a vacuum pump base 703 are arranged in the pressure maintaining box 7; the bottom plate of the pressure maintaining box 7 is provided with an installing plate 706; the fan base 704 is arranged on the installing plate 706; and the axial flow fan 701 is arranged on the fan base 704. In addition, the fan base 704 is also provided with a plurality of evaporators 705; cooling gas in the pressure maintaining box 7 is blown into the thigh air blowing pipe 902 and the shank air blowing pipe 903 through the axial flow fan 701; and the vacuum pump 702 is arranged on the vacuum pump base 703. The axial flow fan 701, the evaporators 705 and the vacuum pump 702 are the known technologies in the art.

The present invention has the operating principle that:

When the present invention is operated, firstly, two mechanical legs are placed in the lower limbs of the spacesuit; the first connecting flange 201 in the connecting component 2 is connected with the pressure maintaining box 7; and the second connecting flange 204 is fixedly connected with the thigh 1 of the mechanical leg. Then, a control system controls the knee joint component 3 and the ankle joint component 4 to move according to preset motion tracks; and the zero position of the device is calibrated by the knee joint photoelectric switch 305 and the ankle joint photoelectric switch 505 after a certain interval f moving period. In a test process, the cooling gas is blown into the thigh 1 and the shank 4 respectively through the thigh air blowing pipe 902 and the shank air blowing pipe 903; and meanwhile, air is sucked from the thigh air suction pipe 901 and the shank air suction pipe 904 so that the gas forms backflow in the thigh 1 and the shank 4 respectively. In addition, in order to avoid scorching the spacesuit due to overhigh temperature, temperature sensors are arranged in the thigh 1 and the shank 4 for monitoring the temperature change in real time. A control valve is arranged on the shank backup air pipe 905. When the temperature alarms, the control valve is turned on to start the shank backup air pipe 905 to blow the cooling gas into the shank 4, to ensure stable internal temperature of the spacesuit.

The invention claimed is:

1. A robot for testing lower limb performance of a spacesuit, comprising a pressure maintaining box (7), an air circulation component, an air cooling unit (11), heat radiating hose components (9), and two mechanical legs, wherein the air cooling unit (11) is connected with the pressure maintaining box (7) through a pipeline; the air circulation component is arranged in the pressure maintaining box (7); the two mechanical legs are installed on the pressure maintaining box (7), and the heat radiating hose components (9) are arranged in the mechanical legs; air in the pressure maintaining box (7) is cooled through the air cooling unit (11) and delivered into the heat radiating hose components (9) through the air circulation component, wherein each mechanical leg comprises a thigh (1), a knee joint component (3), a shank (4), an ankle joint component (5), and a foot (6); the thigh (1) is connected with the shank (4) through the knee joint component (3); the shank (4) is connected with the foot (6) through the ankle joint component (5); the knee joint component (3) is provided with a knee joint driving component (302) and a knee joint transmission component (303); and the ankle joint component (5) is provided with an ankle joint driving component (502) and an ankle joint transmission component (503), and wherein each mechanical leg is connected with the pressure maintaining box (7) through a connecting component (2); the connecting component (2) comprises a first connecting seat (213), a second connecting seat (208), a worm (212), a worm gear (207), and a connecting pin shaft (211); the first connecting seat (213) and the second connecting seat (208) are hinged by the connecting pin shaft (211); the worm (212) is arranged in the first connecting seat (213); the worm gear (207) is arranged in the second connecting seat (208); the worm gear (207) is sleeved on the connecting pin shaft (211); the worm (212) is engaged with the worm gear (207); the first connecting seat (213) is connected with the pressure maintaining box (7); and the second connecting seat (208) is fixedly connected with the thigh (1) of the mechanical leg.

2. The robot for testing lower limb performance of the spacesuit according to claim 1, wherein the thigh (1) comprises a plurality of housings sleeved together in sequence; an upper end of a first thigh shell (101) is connected with the pressure maintaining box (7) through a connecting component (2); a lower end of the first thigh shell (101) is connected with a second thigh shell (102); a thigh shell sliding guide (104) is arranged between the first thigh shell (101) and the second thigh shell (102); the shank (4) comprises a plurality of housings sleeved together in sequence; the upper end of a first shank shell (401) is hinged with the knee joint component (3); the lower end of the first shank shell (401) is connected with a second shank shell (402); and a shank shell sliding guide (403) is arranged between the first shank shell (401) and the second shank shell (402).

3. The robot for testing lower limb performance of the spacesuit according to claim 1, wherein the knee joint component (3) comprises a knee joint shell (301), the knee joint driving component (302), the knee joint transmission component (303), and a knee joint hinging shaft (304); an upper end of the knee joint shell (301) is fixedly connected with the lower end of the thigh (1); a lower end of the knee joint shell (301) is hinged with the upper end of the shank (4) through the knee joint hinging shaft (304); the knee joint transmission component (303) comprises a first knee joint transmission group and a second knee joint transmission group; the knee joint driving component (302) and the first knee joint transmission group are arranged in the thigh (1); and the second knee joint transmission group is arranged in the knee joint shell (301).

4. The robot for testing lower limb performance of the spacesuit according to claim 3, wherein the first knee joint transmission group comprises a knee joint driving gear (3031), a knee joint driven gear (3032), and a knee joint transmission decelerator (3033), wherein the knee joint driving gear (3031) is fixedly connected with an output shaft of the knee joint driving component (302); and the knee joint driven gear (3032) is installed on an input shaft of the knee joint transmission decelerator (3033) and engaged with the knee joint driving gear (3031);

the second knee joint transmission group comprises a knee joint driving bevel gear (3034) and a knee joint driven bevel gear (3035); the knee joint driving bevel gear (3034) is fixedly installed on an output shaft of the knee joint transmission decelerator (3033); and the knee joint driven bevel gear (3035) is fixedly installed on the knee joint hinging shaft (304) and engaged with the knee joint driving bevel gear (3034);

the knee joint hinging shaft (304) is provided with a knee joint torque sensor (3041); in addition, a knee joint photoelectric switch (305) is arranged in the upper end of the shank (4);

and the knee joint shell (301) is provided with a knee joint sensing pin shaft (3051) matched with the knee joint photoelectric switch (305).

5. The robot for testing lower limb performance of the spacesuit according to claim 1, wherein the ankle joint component (5) comprises an ankle joint shell (501), the ankle joint driving component (502), the ankle joint transmission component (503), and an ankle joint hinging shaft (504); an upper end of the ankle joint shell (501) is fixedly connected with the lower end of the shank (4); a lower end of the ankle joint shell (501) is hinged with the foot (6) through the ankle joint hinging shaft (504); the ankle joint transmission component (503) comprises a first ankle joint transmission group and a second ankle joint transmission group; the ankle joint driving component (502) and the first ankle joint transmission group are arranged in the shank (4); and the second ankle joint transmission group is arranged in the ankle joint shell (501).

6. The robot for testing lower limb performance of the spacesuit according to claim 5, wherein the first ankle joint transmission group comprises an ankle joint driving gear (5031), an ankle joint driven gear (5032), and an ankle joint transmission decelerator (5033); the ankle joint driving gear (5031) is fixedly installed on an output shaft of the ankle joint driving component (502); and the ankle joint driven gear (5032) is installed on an input shaft of the ankle joint transmission decelerator (5033) and engaged with the ankle joint driving gear (5031);

the second ankle joint transmission group comprises an ankle joint driving bevel gear (5034) and an ankle joint driven bevel gear (5035); the ankle joint driving bevel gear (5034) is fixedly installed on an output shaft of the ankle joint transmission decelerator (5033); and the ankle joint driven bevel gear (5035) is fixedly installed on the ankle joint hinging shaft (504) and engaged with the ankle joint driving bevel gear (5034);

the ankle joint hinging shaft (504) is provided with an ankle joint torque sensor (5041); in addition, an ankle joint photoelectric switch (505) is arranged in the foot (6); and the ankle joint shell (501) is provided with an ankle joint sensing pin shaft (5051) matched with the ankle joint photoelectric switch (505).

7. The robot for testing lower limb performance of the spacesuit according to claim 1, wherein the foot (6) comprises a connecting seat (602), a sliding pipe (601), a foot shell (603), and a foot bottom plate (604); an upper end of the connecting seat (602) is hinged with the ankle joint component (5), and a lower end is connected with the foot shell (603) through the sliding pipe (601); and the lower side of the foot shell (603) is fixedly connected with the foot bottom plate (604).

8. The robot for testing lower limb performance of the spacesuit according to claim 1, wherein the heat radiating hose component (9) comprises a thigh air pipe component arranged in the thigh (1) and a shank air pipe component arranged in the shank (4); the thigh air pipe component comprises a thigh air suction pipe (901) and a thigh air blowing pipe (902); and the shank air pipe component comprises a shank air suction pipe (904), a shank air blowing pipe (903), and a shank backup air pipe (905).

9. The robot for testing lower limb performance of the spacesuit according to claim 8, wherein the air circulation component comprises an axial flow fan (701) and a vacuum pump (702); the thigh air blowing pipe (902) and the shank air blowing pipe (903) blow air through the axial flow fan (701); the thigh air suction pipe (901) and the shank air suction pipe (904) suck air through the vacuum pump (702).

10. A robot for testing lower limb performance of a spacesuit, comprising a pressure maintaining box (7), an air circulation component, an air cooling unit (11), heat radiating hose components (9), and two mechanical legs, wherein the air cooling unit (11) is connected with the pressure maintaining box (7) through a pipeline; the air circulation component is arranged in the pressure maintaining box (7); the two mechanical legs are installed on the pressure maintaining box (7), and the heat radiating hose components (9) are arranged in the mechanical legs; air in the pressure maintaining box (7) is cooled through the air cooling unit (11) and delivered into the heat radiating hose components (9) through the air circulation component, wherein each mechanical leg comprises a thigh (1), a knee joint component (3), a shank (4), an ankle joint component (5), and a foot (6); the thigh (1) is connected with the shank (4) through the knee joint component (3); the shank (4) is connected with the foot (6) through the ankle joint component (5); the knee joint component (3) is provided with a knee joint driving component (302) and a knee joint transmission component (303); and the ankle joint component (5) is provided with an ankle joint driving component (502) and an ankle joint transmission component (503), and wherein the thigh (1) comprises a plurality of housings sleeved together in sequence; an upper end of a first thigh shell (101) is connected with the pressure maintaining box (7) through a connecting component (2); a lower end of the first thigh shell (101) is connected with a second thigh shell (102); a thigh shell sliding guide (104) is arranged between the first thigh shell (101) and the second thigh shell (102); the shank (4) comprises a plurality of housings sleeved together in sequence; the upper end of a first shank shell (401) is hinged with the knee joint component (3); the lower end of the first shank shell (401) is connected with a second shank shell (402); and a shank shell sliding guide (403) is arranged between the first shank shell (401) and the second shank shell (402).

11. A robot for testing lower limb performance of a spacesuit, comprising a pressure maintaining box (7), an air circulation component, an air cooling unit (11), heat radiating hose components (9), and two mechanical legs, wherein the air cooling unit (11) is connected with the pressure maintaining box (7) through a pipeline; the air circulation component is arranged in the pressure maintaining box (7); the two mechanical legs are installed on the pressure maintaining box (7), and the heat radiating hose components (9) are arranged in the mechanical legs; air in the pressure maintaining box (7) is cooled through the air cooling unit (11) and delivered into the heat radiating hose components (9) through the air circulation component, wherein each mechanical leg comprises a thigh (1), a knee joint component (3), a shank (4), an ankle joint component (5), and a foot (6); the thigh (1) is connected with the shank (4) through the knee joint component (3); the shank (4) is connected with the foot (6) through the ankle joint component (5); the knee joint component (3) is provided with a knee joint driving component (302) and a knee joint transmission component (303); and the ankle joint component (5) is provided with an ankle joint driving component (502) and an ankle joint transmission component (503), and wherein the knee joint component (3) comprises a knee joint shell (301), the knee joint driving component (302), the knee joint transmission component (303), and a knee joint hinging shaft (304); an upper end of the knee joint shell (301) is fixedly connected with the lower end of the thigh (1); a lower end of the knee joint shell (301) is hinged with the upper end of the shank (4) through the knee joint hinging shaft (304); the knee joint transmission component (303) comprises a first knee joint transmission group and a second knee joint transmission group; the knee joint driving component (302) and the first knee joint transmission group are arranged in the thigh (1); and the second knee joint transmission group is arranged in the knee joint shell (301).

\* \* \* \* \*